(12) United States Patent
Ie et al.

(10) Patent No.: US 7,398,200 B2
(45) Date of Patent: Jul. 8, 2008

(54) TOKEN STREAM DIFFERENCING WITH MOVED-BLOCK DETECTION

(75) Inventors: William Ie, Mountain View, CA (US); Adam E. Altman, San Jose, CA (US); Edward R. W. Rowe, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 968 days.

(21) Appl. No.: 10/272,858

(22) Filed: Oct. 16, 2002

(65) Prior Publication Data

US 2004/0083091 A1   Apr. 29, 2004

(51) Int. Cl.
*G06F 17/27* (2006.01)
(52) U.S. Cl. ............................................. 704/9; 704/10
(58) Field of Classification Search ................. None
See application file for complete search history.

(56) References Cited

U.S. PATENT DOCUMENTS

| | | | | |
|---|---|---|---|---|
| 5,835,601 | A * | 11/1998 | Shimbo et al. | 713/165 |
| 6,240,409 | B1 * | 5/2001 | Aiken | 707/4 |
| 6,359,574 | B1 * | 3/2002 | Yariv | 341/50 |
| 6,366,933 | B1 * | 4/2002 | Ball et al. | 715/511 |
| 6,560,620 | B1 * | 5/2003 | Ching | 715/511 |

FOREIGN PATENT DOCUMENTS

EP       1016988       7/2000

OTHER PUBLICATIONS

Chawathe, et al. "Change Detection in Hierarchially Structured Information", SIGMOD 96, ACM, Jun. 4, 1996, pp. 493-504.
Chang, et al. "A Graphical Environment for Change Detection in Structured Documents", Proceedings of the 21st Annual International Computer Software and Applications Conference, COMPSAC 1997, Aug. 13-15, 1997, pp. 536-541.
Hunt, et al. "An Algorithm for Differential File Comparison", Computing Science Technical Report at AT&T Bell Laboratories, Online! 1976, pp. 1-8.
Anonymous, "Araxis Merge Feature Summary", http://web.archive.org/web/20021014082827/http://www.araxis.com/merge/topic_features.html, Oct. 14, 2002, 5 pages.
F. Douglis, T. Ball, Y. Chen and E. Koutsofios; "The AT&T Internet Difference Engine: Traking and Viewing Changes on the Web;" Jan. 1998.
Meyers, E., "An O(ND) Difference Algorithm and its Variations," Journal: Algorithmica vol. 1 No. 2, 1986, pp. 251-266.
"A WinDiff Tutorial," website: http://ei.cs.vt.edu.

* cited by examiner

*Primary Examiner*—Richemond Dorvil
*Assistant Examiner*—Leonard Saint-Cyr
(74) *Attorney, Agent, or Firm*—Fish & Richardson P.C.

(57) ABSTRACT

Methods and apparatus implementing systems and techniques for differencing token streams and detecting moved blocks of tokens. In general, in one implementation, the technique includes: obtaining a first token stream and a second token stream, comparing the first and second token streams to identify a group of tokens that are substantially similar in the first and second token streams, the similar-tokens group including common sub-sequences, which are identical in the first and second token streams, and at least one unmatched token, and presenting matched token information corresponding to the similar-tokens group to represent changes in document flow.

41 Claims, 8 Drawing Sheets

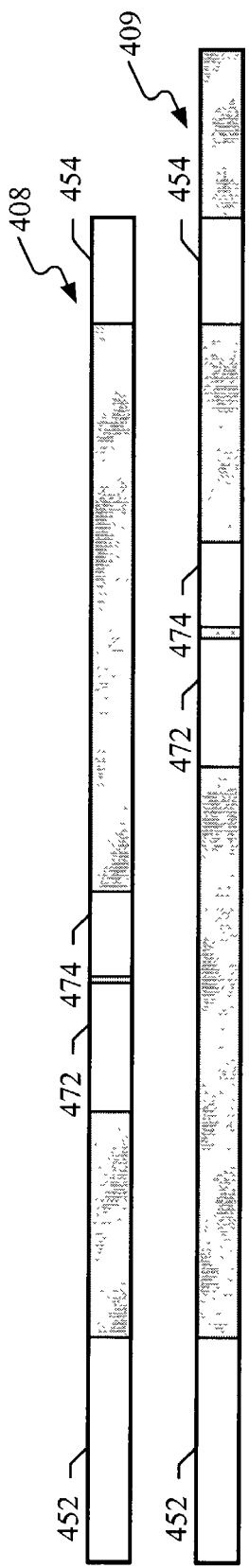
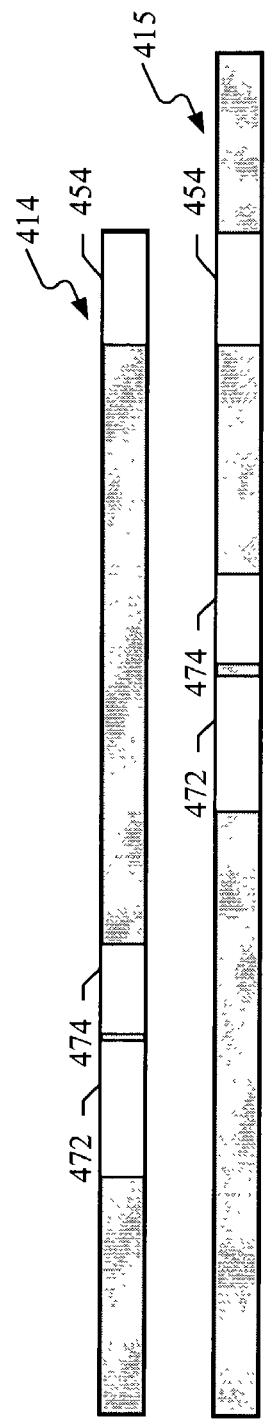
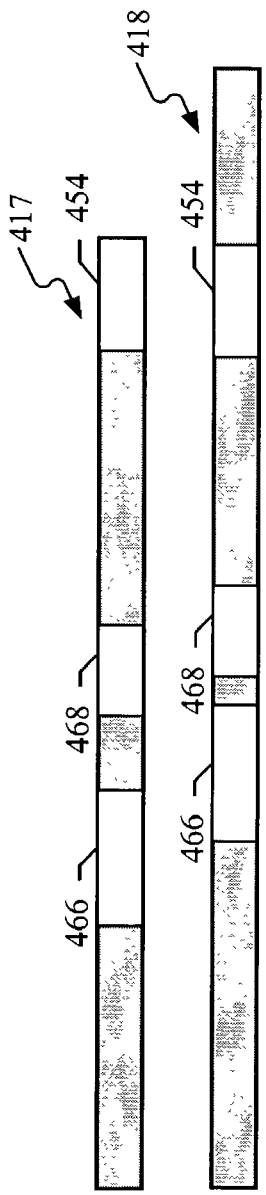
FIG. 6
FIG. 7
FIG. 8

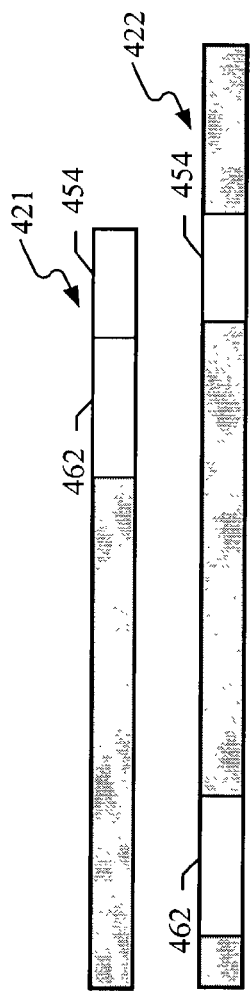
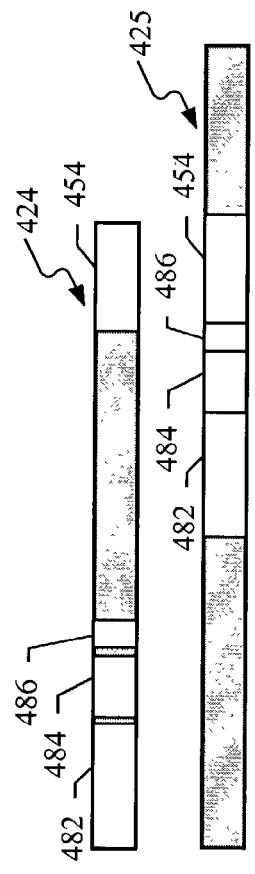
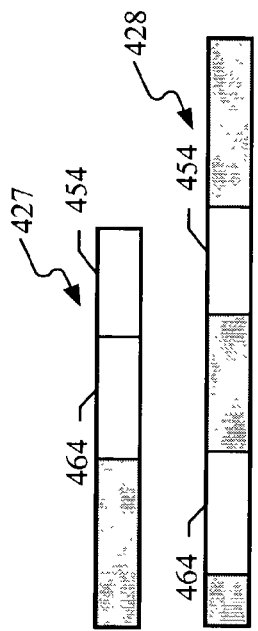
FIG. 9
FIG. 10
FIG. 11

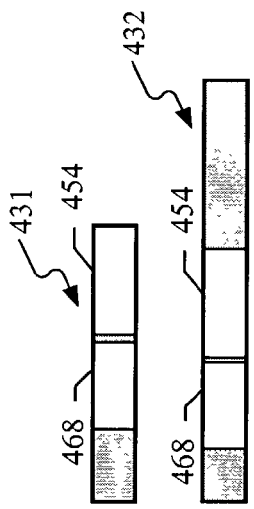
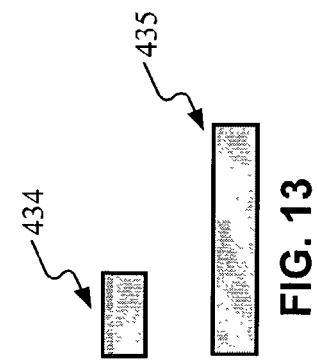
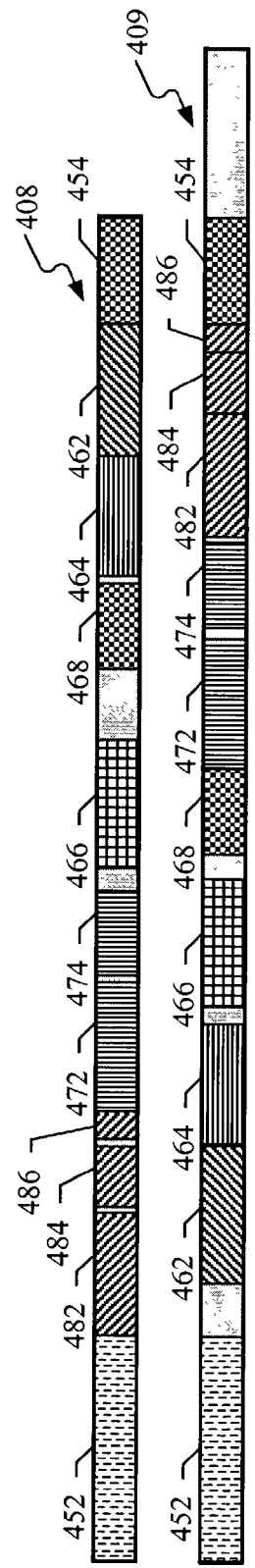
FIG. 12
FIG. 13
FIG. 14

TOKEN STREAM DIFFERENCING WITH MOVED-BLOCK DETECTION

BACKGROUND OF THE INVENTION

The present application describes systems and techniques relating to token stream differencing, for example, comparison of text documents to identify document changes.

Various techniques exist for comparing token streams. Such comparison is commonly referred to as differencing or as a diff operation. Differencing two token streams typically involves comparing two versions of a token stream, commonly referred to as the original stream and the modified stream, and looking for differences between them. In the context of text comparison, many differencing processes use individual text characters or words as the tokens. Such diff processes are fairly good at detecting additions to and deletions from a document. A typical output of a diff operation is an editscript, which is a sequential list of modifications needed to convert an original stream into a modified stream.

Some existing differencing techniques, such as that employed by WinDiff provided by Microsoft Corporation of Redmond, Wash., also support moved-text detection. Typically, these techniques operate at levels of token granularity above the word level. Some use tokens that represent entire lines of text in a document. Such whole-line techniques work well with documents containing software source code because the lines of text in such documents are most likely unique, and because changes to such documents rarely result in text reflows (e.g., adding a word that shifts some words to the next line, which in turn shifts more words to the next line and so on in a domino effect).

Differencing techniques that operate at word-level token granularity, such as the technique employed by Acrobat® 5.0 provided by Adobe Systems Incorporated of San Jose, Calif., frequently misidentify moved blocks of text as additions and deletions. Moreover, when such techniques actually do identify moved blocks, the displayed results can be very confusing because small additions and/or deletions within a moved block of text can create a checker-boarding effect in the generated results, where moved and unmoved words interleave each other, thus cluttering the results report.

SUMMARY OF THE INVENTION

In general, in one aspect, the invention involves obtaining a first token stream and a second token stream, comparing the first and second token streams to identify a group of tokens that are substantially similar in the first and second token streams, the similar-tokens group including common sub-sequences, which are identical in the first and second token streams, and at least one unmatched token, and presenting matched token information corresponding to the similar-tokens group to represent changes in document flow. Implementations of the invention can include one or more of the following advantageous features.

Obtaining a first token stream and a second token stream can involve receiving text information, and converting the text information into the first and second token streams. The similar-tokens group can be tokens corresponding to words in such text information, and comparing the first and second token streams can involve using a predefined sequences differencing technique to identify sub-sequences of words common to the first and second token streams, selecting a sub-sequence from the identified sub-sequences of words, and extending the selected sub-sequence to include one or more additional sub-sequences and one or more intervening words from the first and second token streams in order to form the similar-tokens group. When the tokens correspond to words, these can be words in a language, and the first and second token streams can correspond to a reading order for the words.

Obtaining a first token stream and a second token stream can also involve receiving style information for, and/or receiving structure information representing the structure of, one or more electronic documents, and converting the style information into the first and second token streams and/or converting the structure information into the first and second token streams representing structural elements of the one or more electronic documents. Presenting the matched token information can involve presenting matched token information to a user, such as by displaying matched token information on a display device. Representing matched token information can also involve generating a third token stream incorporating tokens representing changes in document flow (e.g., the third token stream incorporating tokens representing changes between the first and second token streams).

The invention can further involve obtaining additional common sub-sequences and one or more additional groups of tokens that are substantially similar in the first and second token streams, combining matched sets of tokens based on their order in the first and second token streams while disregarding intervening tokens, the matched sets of tokens including the similar-tokens groups and the additional common sub-sequences, and presenting matched token information corresponding to the combined matched sets of tokens to represent changes in document flow. Combining matched sets of tokens can involve combining matched sets of tokens starting with a matched set of tokens having a longest common sub-sequence or starting with a longest of the matched sets of tokens. Presenting matched token information based on the combined matched sets of tokens can involve displaying the first and second token streams using colors to designate the combined matched sets of tokens including the similar-tokens group that includes the at least one unmatched token. Displaying the first and second token streams using colors can involve displaying the first and second token streams side-by-side.

According to a related aspect, the invention involves identifying sub-sequences common to a first token stream and a second token stream, designating a first block of sub-sequences in the first token stream, and designating a second block of sub-sequences in the second token stream. The first block of sub-sequences including two or more of the identified common sub-sequences, the second block of sub-sequences including the two or more of the identified common sub-sequences, and at least one of the first and second blocks includes one or more intervening tokens separating at least two of the two or more of the identified common sub-sequences. And according to this aspect, the invention further involves designating the first and second blocks as a matched block pair based on a result of a comparison of a difference between the first and second blocks and a difference threshold.

The invention can further involve grouping matched block pairs from the first and second token streams based on an order of the matched block pairs in the first and second token streams, and presenting matched block information based on the grouped matched block pairs. The matched block pairs can include identified common sub-sequences not included in any matched block pairs designated based on the difference threshold, and grouping the matched block pairs can involve selecting the matched block pairs for grouping based on lengths. Selecting the matched block pairs for grouping can involve selecting the matched block pairs based on lengths of the identified common sub-sequences. Presenting matched block information can be performed using the techniques used to present matched token information.

Identifying the common sub-sequences can involve generating an editscript for the first and second token streams using a predefined sequences differencing technique, and identifying the common sub-sequences using the generated editscript. The difference threshold can be a configurable difference threshold. Designating the first and second blocks can involve designating the first and second blocks as a matched block pair based on a result of a comparison of the difference between the first and second blocks and a configurable difference threshold and based on a minimum length threshold. The configurable difference threshold can be configured based on a nature of the tokens in the first and second token streams. The invention can further involve determining a quantity of the one or more intervening tokens that differ between the first block and the second block, and determining the difference between the first block and the second block by dividing the quantity of differing tokens by a length of the two or more of the identified common sub-sequences.

Implementations of the invention may occur in hardware, firmware, software or a combination of these, and may include instructions in a software product tangibly stored on a machine-readable medium, where the instructions are operable to cause a programmable processor to perform the operations described. The invention can be a system including means for obtaining a first token stream and a second token stream, and means for comparing the first and second token streams to detect a matched block of tokens including matched sub-sequences moved from first positions in the first token stream to second positions in the second token stream, the matched block of tokens also including at least one unmatched token, and the matched block of tokens being substantially similar in the first and second token streams. The system can include means for obtaining additional matched blocks of tokens from the first and second token streams, the additional matched blocks of tokens including at least one block having a single matched sub-sequence and no unmatched tokens, means for grouping the matched blocks of tokens based on an order of the matched blocks of tokens in the first and second token streams while disregarding intervening tokens, and means for presenting matched block information based on the grouped matched block pairs to illustrate changes in document flow.

The invention can be implemented to realize one or more of the following advantages. Move detection, including detection of moved blocks that were changed slightly but are still substantially similar, allows simpler change tracking between revisions of a document. Additions and deletions are also identified, and the techniques can be used with tokens that represent various types of sequential data. In text documents, a word-level token granularity can be used, while still effectively detecting moved blocks of text with small modifications relative to the size of the block. Moves that occur within a single line can be detected, and text reflows need not cause problems for moved-block detection.

Very good moved-block detection performance can be obtained, even on token streams that have many similarities and are of roughly the same length. A predefined sequences differencing technique can be used as a replaceable component with the systems and techniques of the invention. This design modularity enables additional performance improvements to be realized in the future when faster differencing techniques become available.

Moreover, moved blocks of tokens can be grouped together before a final presentation. Collecting the identified moved blocks into larger groups can reduce visual complexity of a final results presentation, and the grouped blocks can be displayed using colors to assist a reviewer. For example, when the tokens are words in a text document, displaying the grouped blocks using multiple colors can assist a reader in identifying changes in document flow.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 6-14 show example results from performing token stream differencing as described in connection with FIGS. 1 and 2.

Like reference symbols in the various drawings indicate like elements.

DETAILED DESCRIPTION

Figure 1:
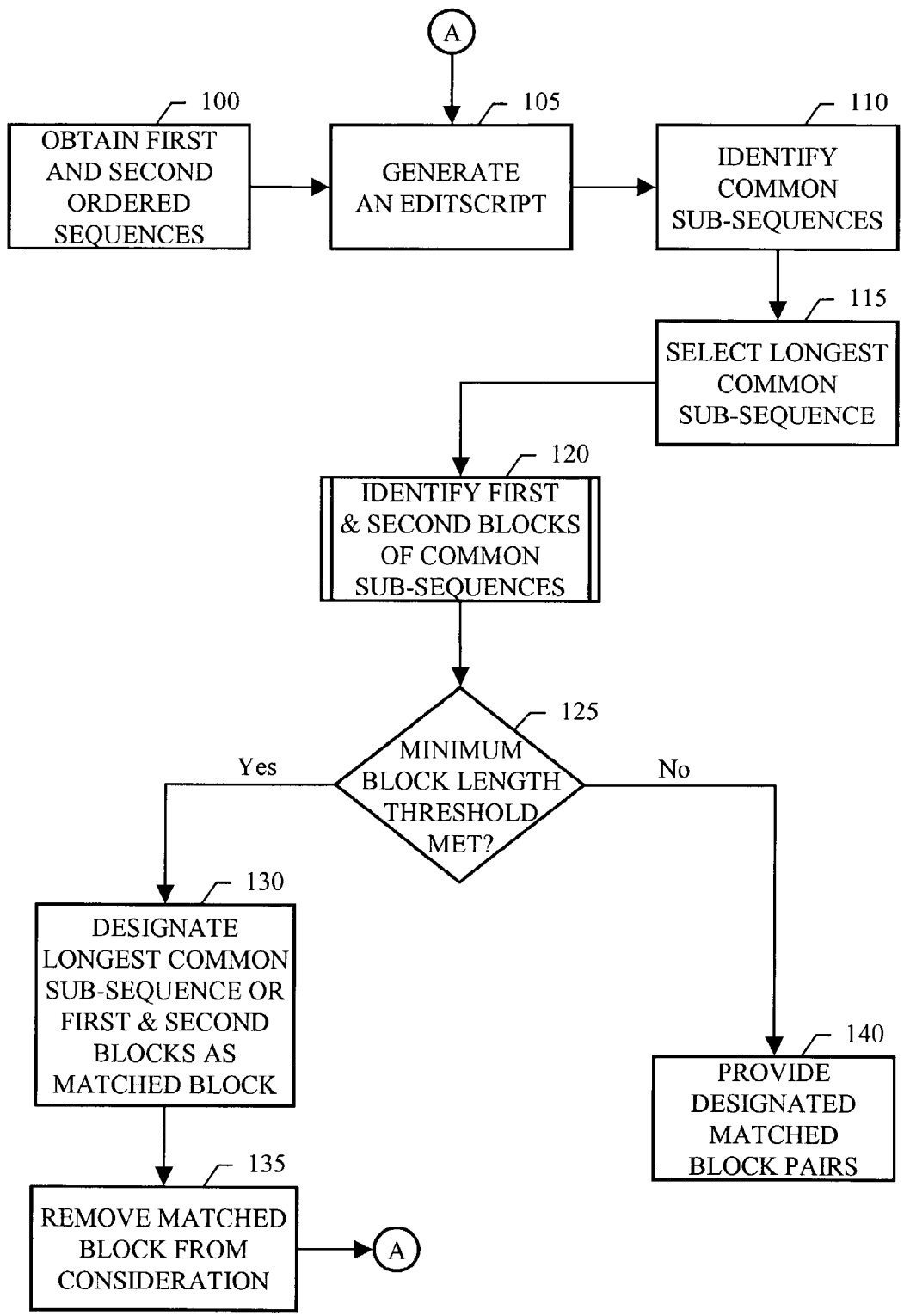
FIG. 1 is a flowchart showing a process of token stream differencing.

FIG. 1 is a flowchart showing a process of token stream differencing. A token stream is an ordered sequence of tokens. The ordered sequence can be in an electronic document. As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Tokens in a token stream can represent nearly anything. For text files, tokens can be characters, words, or lines of text, and can include white space tokens or other text elements. For example, the tokens in a text file can be the words in the file arranged within the token stream in reading order. Tokens can be any discrete data elements that can be arranged in a sequence. For example, in a text stream, style information such as font or boldness can also be stored as tokens, which can be used for different types of rich document comparison. Similarly, a token stream can represent the structure of an electronic document, such as a tree representing a structure hierarchy of the electronic document. Such a structure tree can itself be in the form of an XML document having elements representing nodes of the tree and corresponding to structural elements of the electronic document, such as sections, paragraphs, columns, images and the like. A corresponding token stream can include tokens representing the structural elements forming the structure tree. Tokens can also represent various real world data. For example, tokens can be characters that represent amino acids in a protein, or characters that represent groups of or individual purine and pyrimidine bases in DNA or RNA.

The process illustrated in FIG. 1 begins when a first ordered sequence of tokens and a second ordered sequence of tokens are obtained at 100. The first and second ordered sequences can be included in two versions of a document to be compared with each other. Thus, obtaining the first and second ordered sequences can involve receiving two documents having text information and converting the text information into the first and second ordered sequences of tokens, which may or may not include taking white space into account by including white space as tokens. Alternatively, the first and second ordered sequences can be unrelated to each other, and need not come from different versions of the same document.

An editscript is generated for the first and second sequences using a predefined sequences differencing technique at 105. For example, a differencing technique based on an intuitive edit graph formalism and a greedy design paradigm, such as the Meyers' differencing technique, can be applied to the first and second sequences to generate the editscript. Details of the Meyers' differencing technique can be found in "An O(ND) Difference Algorithm and Its Variations" by Eugene W. Meyers. An editscript specifies a sequence of add token and delete token actions that could be applied to the first token stream to create the second token stream. Typically, an editscript includes a list of tokens to be added or deleted, and locations within the token stream(s) where the adds or deletes are to be performed. In the context of text information, the differencing technique may or may not consider style differences, such as differences in font, when comparing tokens, and those style differences may or may not be encoded as tokens themselves.

The predefined sequences differencing technique can be used as a replaceable component, such as a sequences differencing module. When faster differencing techniques become available, they can be plugged into the system to provide additional performance improvements.

Sub-sequences common to the first and second ordered sequences are identified at 110. This identification of common sub-sequences can be performed using the generated editscript. The editscript identifies tokens that have been determined as different between the two token streams and also identifies add and delete locations. Thus, common sub-sequences can be identified by looking for runs of tokens that are not in the editscript. The manner in which the common sub-sequences can be identified using the editscript depends in part on the format of the editscript. Once the common sub-sequences are identified, a check can be made to determine if the longest of the identified common sub-sequences satisfies a minimum length threshold or a check can be made to determine whether any common sub-sequences have been identified. Such checks can be performed to terminate the process if necessary at the outset.

The longest common sub-sequence is selected at 115. This selected longest common sub-sequence is extended, if possible, by selecting from the two token streams additional common sub-sequences that satisfy a defined relationship to the selected common sub-sequence. The defined relationship can include both an order relationship and a length relationship. The additional common sub-sequences should be in the same order in the two token streams with respect to each other and the longest common sub-sequence. Also, one or more of the additional common sub-sequences are separated from the longest common sub-sequence (and possibly from others sub-sequences of the additional common sub-sequences if there are more than one such sub-sequence) by one or more intervening tokens in at least one of the first and/or second token streams.

As used herein, an intervening token is an unmatched token that separates the common sub-sequences. An unmatched token is a token other than those found in the common sub-sequences. The additional common sub-sequences should have lengths and positions in the two token streams such that, when the additional common sub-sequences, the longest common sub-sequence and any intervening tokens in the first ordered sequence are considered as a first block, and when the additional common sub-sequences, the longest common sub-sequence and any intervening tokens in the second ordered sequence are considered as a second block, these first and second blocks are substantially similar. The first and second blocks are substantially similar when the difference between them is within an acceptable limit for a given context based on a difference measure (e.g., the total number of intervening tokens is less than or equal to a defined percentage of the tokens in the common sub-sequences to be grouped as a matched block pair). Various difference measures are possible, and the first and second blocks are ordered blocks, such that the common sub-sequences in the first and second blocks maintain their order as found in the first and second ordered sequences.

A defined process can be used to identify first and second blocks of common sub-sequences that can be designated as a matched block pair at 120. A matched block pair can be a set of tokens from the two token streams that includes common sub-sequences and satisfies the defined relationship. Common sub-sequences that fall on the same side of the selected common sub-sequence(s) in both token streams can be added to the first and second blocks. And the first and second blocks can be designated a matched block pair if a difference between the first and second blocks falls below a difference threshold, which can be configurable, such as by a user. An example of the defined process is described below in connection with FIG. 2. As a result, a large moved block of text with small changes made in the block of text after the move can be designated as a matched block pair and reported to a user as a moved block.

In addition, designating the first and second blocks as a matched block pair, or designating the longest common sub-sequence as a matched block pair when the longest common sub-sequence cannot be extended, can depend on a minimum length threshold, which also can be configurable, such as by a user. Thus, a length of the selected common sub-sequences plus any intervening token(s) can be checked against a length threshold at 125. When the longest common sub-sequence has been extended, this length check can involve comparing the average length of the first and second blocks to the length threshold.

If the minimum block length threshold is satisfied, the longest common sub-sequence or the first and second blocks are designated a matched block pair at 130. The designated matched block pair is removed from the first and second sequences at 135. Then, the process repeats by generating a new editscript at 105. The process continues until the minimum length threshold is not satisfied, at which point, the designated matched block pairs are provided at 140. The matched block pairs can be displayed to a user or used in further processing, such as described below in connection with FIG. 3.

Figure 2:
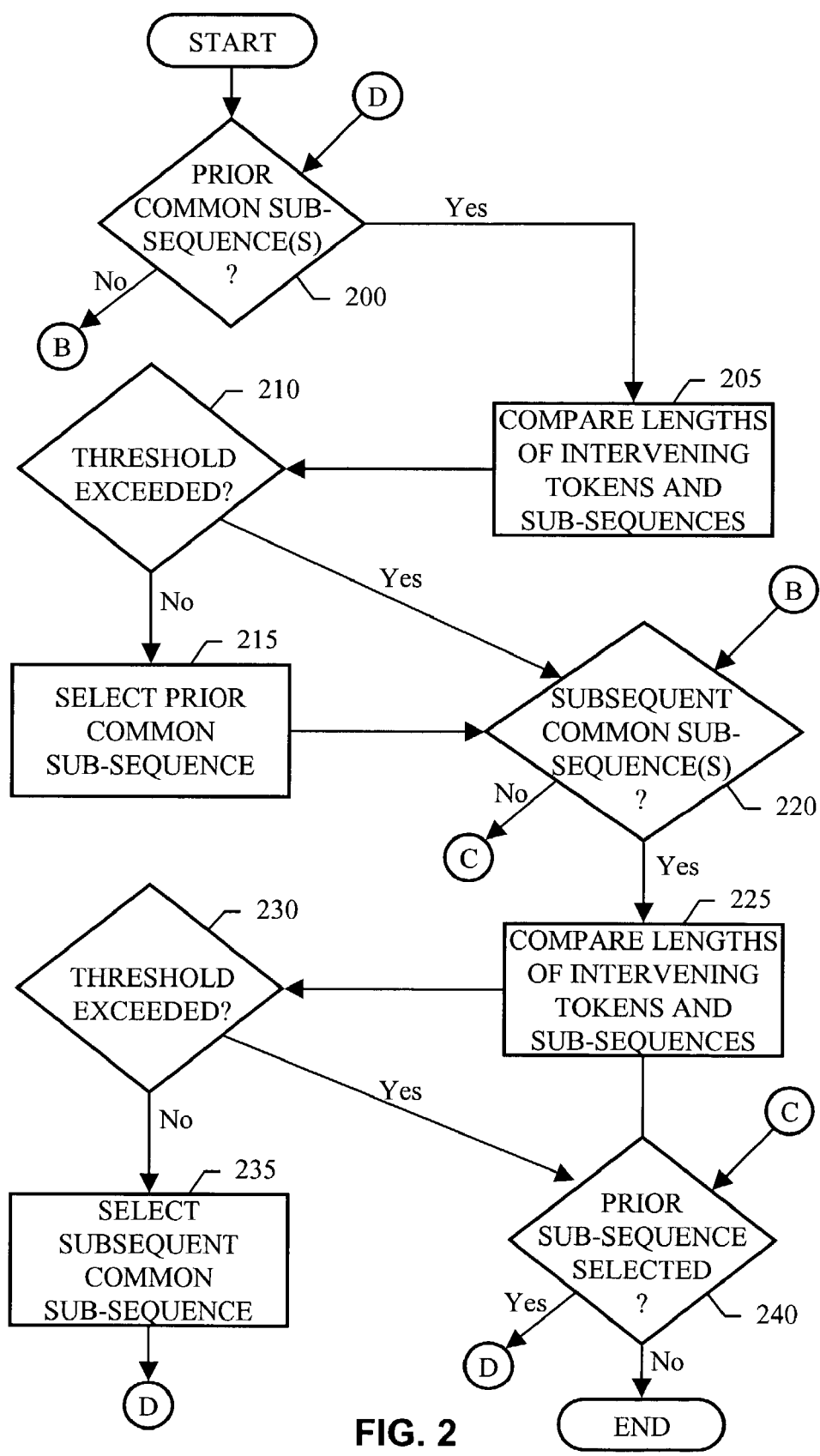
FIG. 2 is a flowchart showing a process of identifying first and second blocks of common sub-sequences that can be designated as a matched block pair despite intervening unmatched tokens in two token streams being compared.

Blocks that contain common subsequences can be designated as matched block pairs even if the common subsequences are separated by one or more intervening tokens in the token streams being compared. FIG. 2 is a flowchart illustrating a process of identifying first and second blocks of common subsequences under such conditions. This process can be used as the defined process discussed in connection with FIG. 1 above. The process begins with a check to determine if a common sub-sequence lies before a received selected common sub-sequence in both of the two token streams at 200. If so, the prior common sub-sequence and the selected common sub-sequence can be grouped as a matched block pair provided they are not separated by too many intervening tokens. The number of intervening tokens is compared with the length of the combined common sub-sequences at 205. When the prior common sub-sequence is being checked against multiple selected common sub-sequences, all the intervening tokens are taken into consideration at 205.

If a difference threshold is not exceeded at 210, the prior common sub-sequence is selected at 215. The difference threshold can be configured, for example, based on the application for which the techniques are being used, and/or a nature of the tokens in the two token streams. For example, if the tokens are words in the English language, and the techniques are used to detect changes in document flow for two versions of a text document, the difference threshold can be set at 7.2%. The comparison used to generate a difference value can involve dividing the number of intervening tokens in the two token streams by the combined length of the two common sub-sequences. Thus, in one implementation, if the length of the selected sub-sequence is twenty five tokens, and the length of the sub-sequence to be selected is fifteen tokens, then up to four intervening tokens can be accepted; and the two sub-sequences can still be designated as a matched block pair, since they are substantially similar to each other in the two token streams.

While the check described determines whether the threshold is exceeded, other difference formulations and/or checks are also possible. For example, when the selected subsequence(s) and the sub-sequence to be grouped are considered as two blocks (the first block being the sub-sequences plus any intervening tokens in the first token stream, and the second block being the sub-sequences plus any intervening tokens in the second token stream), a difference between the first and second blocks can be measured as the length of the selected common sub-sequences divided by the number of intervening tokens, where smaller numbers correspond to more difference between the first and second blocks.

If no prior common sub-sequence exists, or if a prior sub-sequence exists but there are too many intervening tokens (e.g., the threshold is exceeded), or if the prior sub-sequence has been selected for grouping in a matched block pair, a check is then made to determine if a common sub-sequence lies after the selected common sub-sequence(s) in both of the two token streams at 220. If so, the subsequent common sub-sequence and the selected common subsequence(s) can be grouped as a matched block pair provided there are not too many intervening tokens. The number of intervening tokens are compared with the length of the combined common sub-sequences at 225. When the subsequent common sub-sequence is being checked against multiple selected common sub-sequences, all the intervening tokens are taken into consideration at 225.

If the difference threshold is not exceeded at 230, the subsequent common sub-sequence is selected at 235. The difference threshold can be configurable and can be based on a nature of the tokens in the two token streams and can use alternative difference formulations/checks. If a new sub-sequence has been selected, the process repeats at 200.

If no subsequent sub-sequence exists, or if a subsequent sub-sequence exists but there are too many intervening tokens, a check is made at 240 to determine if a prior sub-sequence was selected during this pass of the process. If so, the process repeats at 200. If not, the process ends. This final check at 240 ensures that the process does not end until two sequential failures to extend the selected common sub-sequence(s) has occurred. This allows larger extensions since the order of selecting adjacent common sub-sequences can affect the outcome, and thus all orders of selection should be tried.

Figure 3:
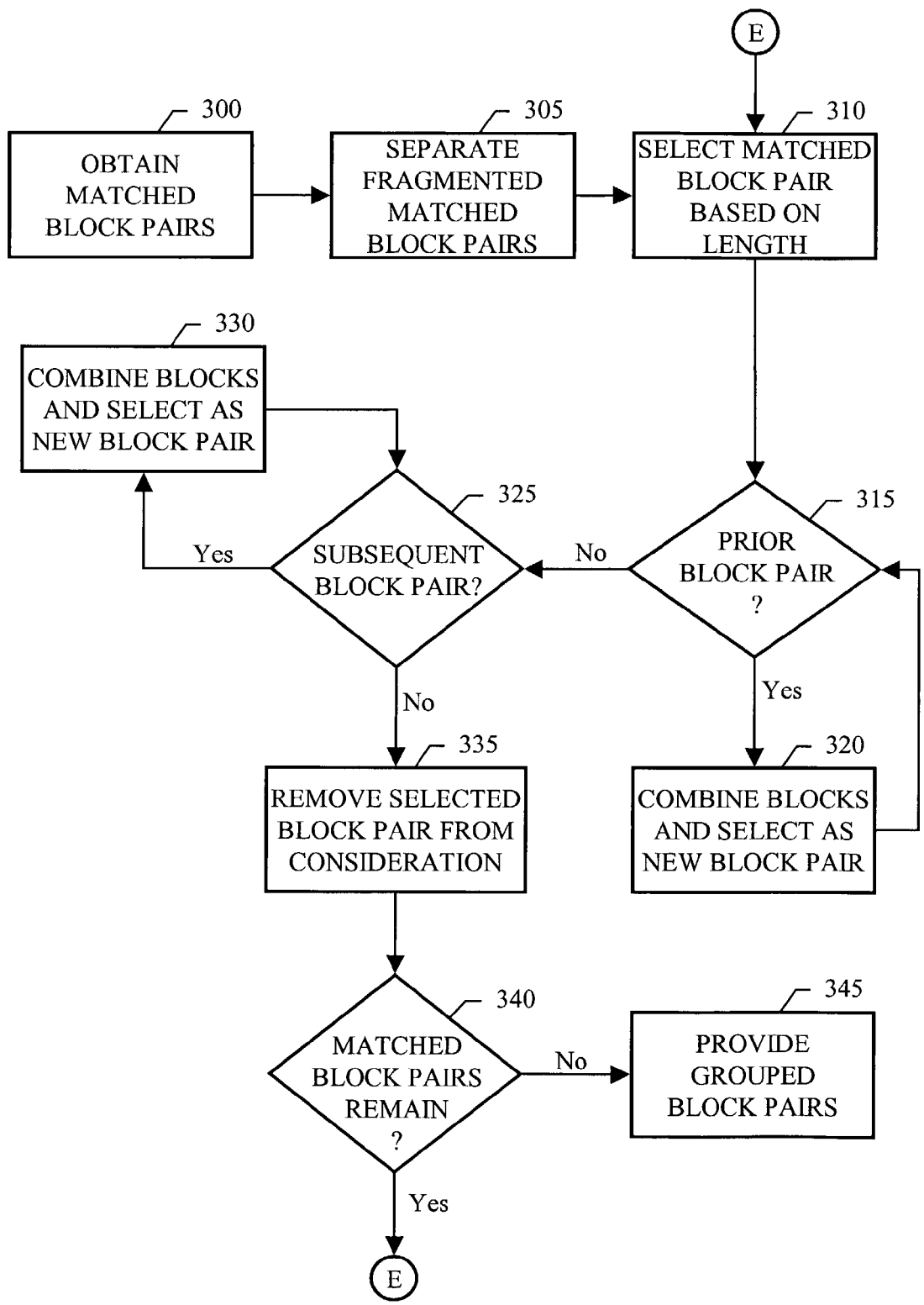
FIG. 3 is a flowchart showing a process of grouping matched block pairs to facilitate illustration of changes in sequence flow between two token streams.

FIG. 3 is a flowchart showing a process of grouping matched block pairs to facilitate illustration of changes in sequence flow between two token streams. This process can be used with the results of the techniques described above to simplify final results for presentation to a user. The process begins by obtaining matched block pairs at 300. The matched block pairs can be obtained using the techniques described above. The matched block pairs can include common sub-sequences with no intervening tokens from two token streams, and they can include grouped common sub-sequences with intervening tokens from the two token streams. The obtained matched block pairs can be sorted by length, such as by the lengths of the matched block pairs or by the lengths of the largest common sub-sequences in the matched block pairs.

In some cases, a matched block pair can be fragmented in one or both of the token streams. For example, a first matched block pair can be a common sub-sequence A, and a second matched block pair can include two common sub-sequences B and C. Sub-sequence A starts at index forty in a first token stream and at index seventy-seven in a second token stream. Sub-sequence B starts at index seventy in the first token stream and at index fifty in the second token stream, and sub-sequence C starts at index one hundred in the first token stream and at index one hundred in the second token stream. Thus, the second matched block pair is fragmented because the first matched block pair (i.e., subsequence A) falls between subsequences B and C in the second token stream but not in the first token stream.

Any fragmented matched block pairs can be separated at 305. If fragmented matched block pairs are separated, the new matched block pairs can be re-positioned in a list of matched block pairs based on their new lengths, such as described above. Then, a matched block pair is selected based on length at 310. This selection can be of the matched block pair with the longest overall length or the matched block pair with the longest common sub-sequence included therein. Then, the selected block pair is expanded if possible.

A check is made to determine if another matched block pair lies before the selected block pair in both token streams at 315. If so, the selected block pair is combined with the prior block pair, and the combined block pair is made the newly selected block pair at 320. This is repeated until no more prior block pairs exist or until a total number of block pairs has been reduced to a predefined number.

Then, a check is made to determine if another matched block pair lies after the selected block pair in both token streams at 325. If so, the selected block pair is combined with the subsequent block pair, and the combined block pair is made the newly selected block pair at 330. This is repeated until no more subsequent block pairs exist or until the total number of block pairs has been reduced to the predefined number.

Then, the selected block pair, which can include multiple block pairs that have been grouped into a single block pair, is removed from further consideration in block pair grouping at 335. If any matched block pairs remain for consideration at 340, the process repeats by selecting the next largest block pair at 310. Otherwise, the grouped matched block pairs are provided at 345. Additionally, the process can terminate and provide the grouped matched block pairs if the total number of block pairs has been reduced to the predefined number.

Figure 4:
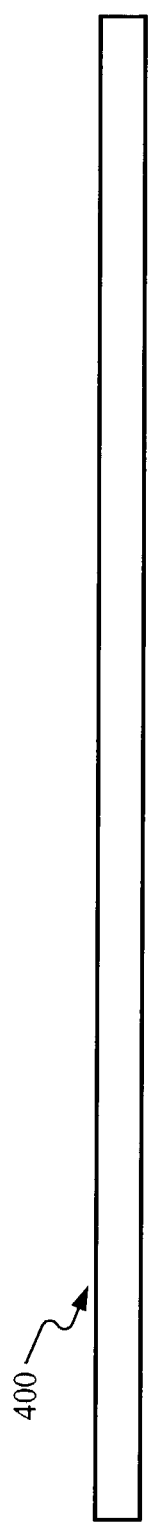
FIG. 4 shows an example representation of a token stream.

FIG. 4 shows an example representation of a token stream 400. The token stream 400 is an ordered sequence of tokens, such as described above. The tokens in the sequence can be designated using indexes into the sequence 400. Sub-sequences of tokens can be designated using beginning and ending indexes into the sequence 400.

Figure 5:
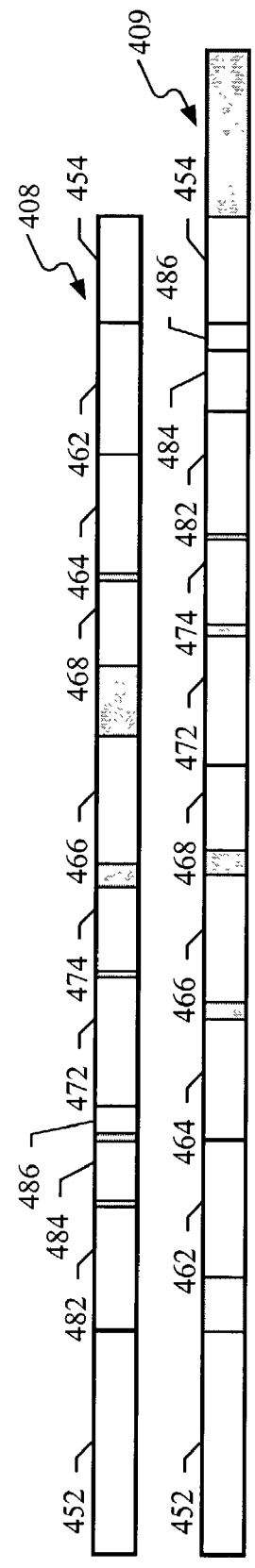
FIG. 5 shows example token streams and common sub-sequences.

FIG. 5 shows example token streams and common sub-sequences. Token sub-sequences 452, 454, 462, 464, 466, 468, 472, 474, 482, 484, 486 appear in both a first ordered sequence of tokens 408 and a second ordered sequence of tokens 409. Thus, these are common sub-sequences 452, 454, 462, 464, 466, 468, 472, 474, 482, 484, 486. Tokens that are not part of the common sub-sequences are shown as grayed out portions of the first and second sequences 408, 409. Thus, if the sequence 408 represents an original document and the sequence 409 represents a modified document, the grayed out portions of the sequence 408 correspond to deletions, and the grayed out portions of the document 409 correspond to additions. In the example shown, the two sequences 408, 409 represent an original and modified document where many sub-sequences of tokens have been moved as blocks from one part of the document to another.

FIGS. 6-14 show example results from performing token stream differencing as described in connection with FIGS. 1 and 2. The two sequences 408, 409 can be compared using a predefined sequences differencing technique. The results of applying this predefined sequences differencing technique can be used to identify common sub-sequences 452, 472, 474, 454 as shown in FIG. 6. As can be seen, the predefined technique fails to identify all of the moved blocks of tokens. Thus, the other common sub-sequences 462, 464, 466, 468, 482, 484, 486 shown in FIG. 5 are misidentified as additions and deletions by the predefined sequences differencing technique. Various predefined sequences differencing techniques are likely to exhibit varying degrees of ability to identify all the common sub-sequences in two token streams. The example illustrated here uses a predefined technique that cannot detect common sub-sequences having different sequential orders in the two streams relative to each other, but other more robust differencing techniques can also be used.

A longest sub-sequence 452 is selected, but cannot be extended to include the subsequent common sub-sequence 472 because there are too many intervening tokens. The sub-sequence 452 satisfies a minimum block length threshold and is thus designated as a matched block pair in the sequences 408, 409. The new matched block pair is removed from further consideration, creating two new sequences 414, 415 as shown in FIG. 7.

The two sequences 414, 415 are compared using the predefined sequences differencing technique. The results are used to identify common sub-sequences 472, 474, 454 as shown in FIG. 7. The other common sub-sequences 462, 464, 466, 468, 482, 484, 486 shown in FIG. 5 are still misidentified as additions and deletions by the predefined sequences differencing technique.

A longest sub-sequence 472 is selected and then extended to include the subsequent common sub-sequence 474. These two common sub-sequences 472, 474 include intervening tokens in both of the two tokens streams (i.e., there are both additions and deletions between these two common sub-sequences). But the total number of these intervening tokens is not large enough to prevent the common sub-sequences 472, 474 from being identified as part of a potential matched block pair. The common sub-sequences 472, 474, plus the intervening tokens, satisfy the minimum block length threshold and are thus designated as a matched block pair in the sequences 408, 409. This matched block pair, which includes the intervening tokens, is removed from further consideration, creating two new sequences 417, 418 as shown in FIG. 8.

The two sequences 417, 418 are compared using the predefined sequences differencing technique. The results are used to identify common sub-sequences 466, 468, 454 as shown in FIG. 8. Thus, common sub-sequences 466, 468 have been newly identified because of the removal of the previously identified common sub-sequences 452, 472, 474. Additional common sub-sequences 462, 464, 482, 484, 486 shown in FIG. 5 are still misidentified as additions and deletions by the predefined sequences differencing technique.

A longest sub-sequence 466 is selected, but cannot be extended to include the subsequent common sub-sequence 468 because there are too many intervening tokens. The sub-sequence 466 is designated as a matched block pair in the sequences 408, 409. This new matched block pair is removed from further consideration, creating two new sequences 421, 422 as shown in FIG. 9.

The two sequences 421, 422 are compared using the predefined sequences differencing technique. The results are used to identify common sub-sequences 462, 454 as shown in FIG. 9. Thus, the common sub-sequence 468 identified previously has now been misidentified as additions and deletions once again, due to the removal of the common sub-sequence 466.

A longest common sub-sequence 462 is selected, but cannot be extended to include the subsequent common sub-sequence 454 because there are too many intervening tokens. The sub-sequence 462 is designated as a matched block pair in the sequences 408, 409. This new matched block pair is removed from further consideration, creating two new sequences 424, 425 as shown in FIG. 10.

The two sequences 424, 425 are compared using the predefined sequences differencing technique. The results are used to identify common sub-sequences 482, 484, 486, 454 as shown in FIG. 10. A longest sub-sequence 482 is selected and then extended to include the subsequent common sub-sequences 484, 486. The three common sub-sequences 482, 484, 486 include intervening tokens in only one of the two tokens streams. As shown, intervening tokens have been deleted from the original token stream between the three common sub-sequences 482, 484, 486, but no additional intervening tokens have been added. The common sub-sequences 482, 484, 486, plus the intervening tokens, satisfy both the maximum allowed difference threshold and the minimum block length threshold and are thus designated as a matched block pair in the sequences 408, 409. This matched block pair, which includes the intervening tokens, is removed from further consideration, creating two new sequences 427, 428 as shown in FIG. 11.

The two sequences 427, 428 are compared using the predefined sequences differencing technique. The results are used to identify common sub-sequences 464, 454 as shown in FIG. 11. A longest common sub-sequence 464 is selected, but cannot be extended to include the subsequent common sub-sequence 454 because there are too many intervening tokens. The sub-sequence 464 is designated as a matched block pair in the sequences 408, 409. This new matched block pair is removed from further consideration, creating two new sequences 431, 432 as shown in FIG. 12.

The two sequences 431, 432 are compared using the predefined sequences differencing technique, and the results are used to identify common sub-sequences 468, 454 as shown in FIG. 12. A longest sub-sequence 454 is selected and then extended to include the prior common sub-sequence 468. These two common sub-sequences 454, 468 include intervening tokens in both of the two tokens streams. But the total number of these intervening tokens is not large enough to prevent the common sub-sequences 454, 468 from being identified as part of a potential matched block pair. The common sub-sequences 454, 468, plus the intervening tokens, satisfy the minimum block length threshold and are thus designated as a matched block pair in the sequences 408, 409. This matched block pair, which includes the intervening tokens, is removed from further consideration, creating two new sequences 434, 435 as shown in FIG. 13.

The two sequences 434, 435 are compared using the predefined sequences differencing technique. The results provide no additional common sub-sequences. Thus, the process of identifying matched block pairs ends.

The common sub-sequences 452, 454, 462, 464, 466, 468, 472, 474, 482, 484, 486 have been arranged into matched block pairs as shown in token sequences 408, 409 in FIG. 14. These matched block pairs can be assigned colors as shown and as described in Table 1.

TABLE 1

Designated Matched Block Pairs

| Common Sub-sequences | Color | Pattern |
|---|---|---|
| 452 | Purple | |
| 482, 484, 486 | Green | |
| 472, 474 | Red | |
| 466 | Yellow | |
| 468, 454 | Orange | |
| 464 | Blue | |
| 462 | Brown | |

In a visual presentation of the comparison results, these colors can be applied to the tokens themselves (e.g., text characters) or to the background of the tokens (e.g., colored highlighting of text characters). Displaying the matched block pairs using colors can assist a reader in identifying changes in document flow. However, when many colors are used, this can add confusion to the review of document comparison results. To avoid confusion caused by color proliferation, the largest matched block pair can be shown with no color change. This largest matched block pair can be considered as the base stream in which all other block moves of tokens take place. Additionally, the matched block pairs can be grouped together as described above in connection with FIG. 3 to reduce visual complexity of the final results presentation.

Figure 15:
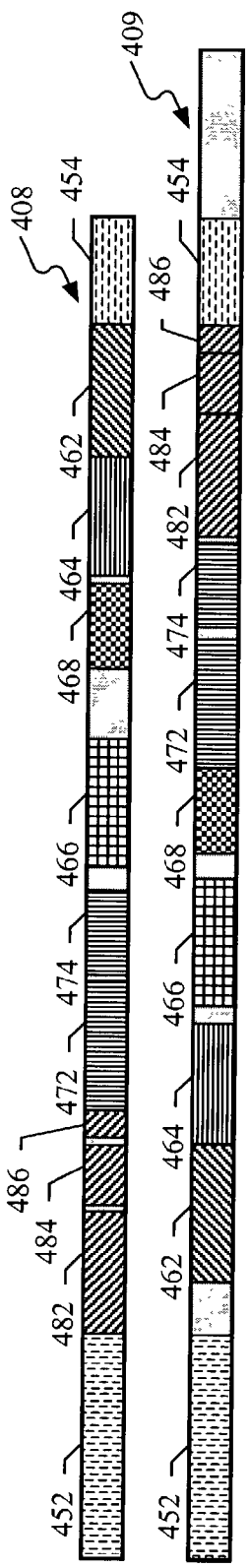
FIGS. 15-17 show example results from grouping matched block pairs as described in connection with FIG. 3.
Figure 16:
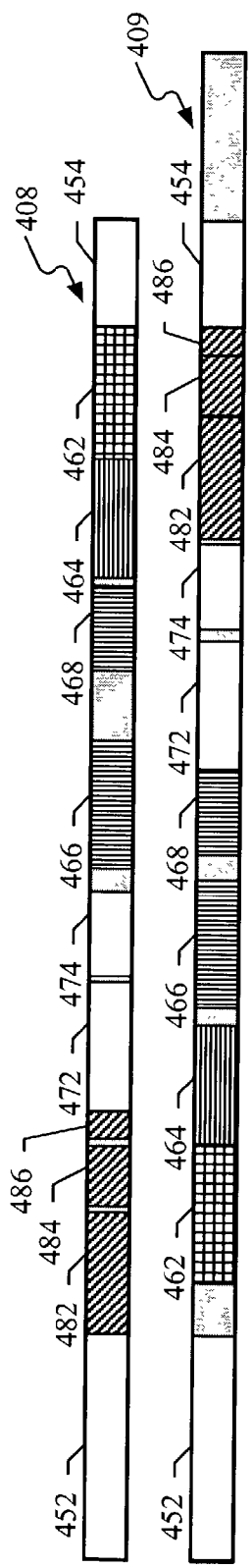
Figure 17:
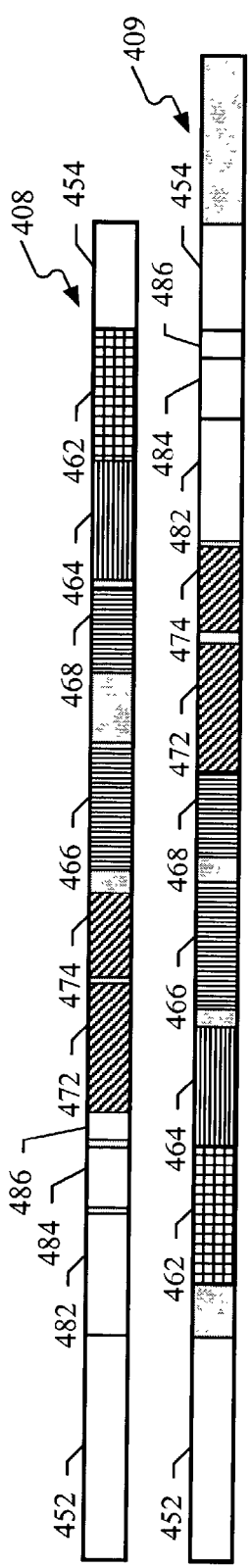

FIGS. 15-17 show example results from grouping matched block pairs as described in connection with FIG. 3. The matched block pair 468, 454, which is fragmented as shown in FIG. 14, is separated into two new matched block pairs as shown in token sequences 408, 409 in FIG. 15 and as described in Table 2.

TABLE 2

Designated Matched Block Pairs After Eliminating Fragmentation

| Common Sub-sequences | Color | Pattern |
|---|---|---|
| 452 | Purple | |
| 482, 484, 486 | Green | |
| 472, 474 | Red | |
| 466 | Yellow | |
| 468 | Orange | |
| 464 | Blue | |
| 462 | Brown | |
| 454 | Silver | |

The matched block pairs are then combined with prior and subsequent matched block pairs to the beginning and end of the token streams based on a length of the matched block pairs and based on an order of the matched block pairs in the token streams. Two matched block pairs are not combined if their beginning and ending sequential ordering is not the same in the two token streams. Thus, the matched block pairs resulting from combination cannot have common sub-sequences that are in different orders in the two token streams (e.g., 464 and 468 cannot be combined).

The combining of matched block pairs can begin with the matched block pair with the longest overall length or the matched block pair with the longest common sub-sequence included therein. For example, if the matched block pairs of FIG. 15 are combined starting with the matched block pair with the largest common sub-sequence, the matched block pair 452 is expanded first to include the matched block pair 472, 474 and the matched block pair 454. Once the matched block pairs have been combined, colors can be assigned to highlight moved blocks of tokens, including no color for the largest matched block pair, as shown in token sequences 408, 409 in FIG. 16 and as described in Table 3.

TABLE 3

Matched Block Pairs After Grouping Based on Longest Sub-Sequences

| Common Sub-sequences | Color | Pattern |
|---|---|---|
| 452, 472, 474, 454 | No Color | |
| 482, 484, 486 | Green | |
| 466, 468 | Red | |
| 464 | Blue | |
| 462 | Yellow | |

In contrast, if the matched block pairs of FIG. 15 are combined starting with the largest matched block pair overall, the matched block pair 482, 484, 486 is expanded first to include the matched block pair 452 and the matched block pair 454. Once the matched block pairs have been combined, colors can be assigned to highlight moved blocks of tokens, including no color for the largest matched block pair, as shown in token sequences 408, 409 in FIG. 17 and as described in Table 4.

TABLE 4

Matched Block Pairs After Grouping Based on Matched Block Pairs

| Common Sub-sequences | Color | Pattern |
|---|---|---|
| 452, 482, 484, 486, 454 | No Color | |
| 472, 474 | Green | |
| 466, 468 | Red | |
| 464 | Blue | |
| 462 | Yellow | |

The intervening tokens, shown as grayed out portions of token sequences 408, 409 in FIGS. 14-17, can be presented using traditional techniques, such as strike-through to indicate deletions and underline to indicate additions. These additions and deletions can be colored by the same color as any matched block pair that contains them. Additionally, when highlighting moved blocks of tokens in the context of text information, font differences can be identified, even when these font differences were not considered during identification of matched block pairs. The results of the token stream differencing and/or matched block grouping as described above can be visually presented to a user as a single document displayed on a screen or as two documents displayed side-by-side on a screen.

The invention can be implemented in digital electronic circuitry, or in computer hardware, firmware, software, or in combinations of them. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD (liquid crystal display) screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the operations of the invention can be performed in a different order and still achieve desirable results. The results of a comparison of two token streams according to the techniques described above can be displayed using visual attributes other than color, such as text styling, patterns, or the like. The comparison results can also be represented using non-visual information, such as auditory cues. The comparison results can also be represented by generating a third token stream incorporating tokens that represent changes between the original token streams. Where the token streams represent the text, stylistic or structural flow of electronic documents, the comparison results can be represented by incorporating tags or marks into the electronic documents to represent locations where changes have been made. Although the comparison techniques have been described in the context of comparing two token streams, additional token streams can be compared using the same techniques.

What is claimed is:

1. A method comprising:
   obtaining a first token stream and a second token stream;
   comparing the first and second token streams to identify a group of tokens that are substantially similar in the first and second token streams, the similar-tokens group including common sub-sequences, which are identical in the first and second token streams, and at least one unmatched intervening token separating the common sub-sequences; and
   representing matched token information corresponding to the similar-tokens group to represent changes in document flow.

2. The method of claim 1, wherein obtaining a first token stream and a second token stream comprises:
   receiving text information; and
   converting the text information into the first and second token streams.

3. The method of claim 2, wherein the similar-tokens group comprises tokens corresponding to words in the text information, and wherein comparing the first and second token streams comprises:
   using a predefined sequences differencing technique to identify sub-sequences of words common to the first and second token streams;
   selecting a sub-sequence from the identified sub-sequences of words; and
   extending the selected sub-sequence to include one or more additional sub-sequences and one or more intervening words from the first and second token streams in order to form the similar-tokens group.

4. The method of claim 1, wherein obtaining a first token stream and a second token stream comprises:
   receiving style information for one or more electronic documents; and
   converting the style information into the first and second token streams.

5. The method of claim 1, wherein obtaining a first token stream and a second token stream comprises:
receiving structure information representing structure of one or more electronic documents; and
converting the structure information into the first and second token streams representing structural elements of the one or more electronic documents.

6. The method of claim 1, wherein:
representing matched token information includes presenting matched token information to a user.

7. The method of claim 6, wherein:
presenting matched token information to a user includes displaying matched token information on a display device.

8. The method of claim 1, wherein:
representing matched token information includes generating a third token stream incorporating tokens representing changes in document flow.

9. The method of claim 1, further comprising:
obtaining additional common sub-sequences and one or more additional groups of tokens that are substantially similar in the first and second token streams;
combining matched sets of tokens based on their order in the first and second token streams while disregarding intervening tokens, the matched sets of tokens including the similar-tokens groups and the additional common sub-sequences; and
representing matched token information corresponding to the combined matched sets of tokens to represent changes in document flow.

10. The method of claim 9, wherein combining matched sets of tokens comprises combining matched sets of tokens starting with a matched set of tokens having a longest common sub-sequence.

11. The method of claim 9, wherein combining matched sets of tokens comprises combining matched sets of tokens starting with a longest of the matched sets of tokens.

12. The method of claim 9, wherein representing matched token information based on the combined matched sets of tokens comprises displaying the first and second token streams using colors to designate the combined matched sets of tokens including the similar-tokens group that includes the at least one unmatched token.

13. The method of claim 12, wherein displaying the first and second token streams using colors comprises displaying the first and second token streams side-by-side.

14. A method comprising:
identifying sub-sequences common to a first token stream and a second token stream;
designating a first block of sub-sequences in the first token stream, the first block of sub-sequences including two or more of the identified common sub-sequences;
designating a second block of sub-sequences in the second token stream, the second block of sub-sequences including the two or more of the identified common sub-sequences, wherein at least one of the first and second blocks includes one or more intervening tokens separating at least two of the two or more of the identified common sub-sequences; and
designating the first and second blocks as a matched block pair based on a result of a comparison of a difference between the first and second blocks and a difference threshold.

15. The method of claim 14, further comprising:
grouping matched block pairs from the first and second token streams based on an order of the matched block pairs in the first and second token streams; and
representing matched block information based on the grouped matched block pairs.

16. The method of claim 15, wherein the matched block pairs include identified common sub-sequences not included in any matched block pairs designated based on the difference threshold, and wherein grouping the matched block pairs comprises selecting the matched block pairs for grouping based on lengths.

17. The method of claim 16, wherein selecting the matched block pairs for grouping comprises selecting the matched block pairs based on lengths of the identified common sub-sequences.

18. The method of claim 15, wherein:
representing matched block information includes presenting matched block information to a user.

19. The method of claim 18, wherein:
presenting matched block information to a user includes displaying matched block information on a display device.

20. The method of claim 18, wherein:
representing matched block information includes generating a third token stream incorporating tokens representing changes between the first and second token streams.

21. The method of claim 14, wherein the tokens in the first and second token streams comprise words in a language, and the first and second token streams correspond to a reading order for the words.

22. The method of claim 14, wherein identifying the common sub-sequences comprises:
generating an editscript for the first and second token streams using a predefined sequences differencing technique; and
identifying the common sub-sequences using the generated editscript.

23. The method of claim 14, wherein the difference threshold comprises a configurable difference threshold, and wherein designating the first and second blocks comprises designating the first and second blocks as a matched block pair based on a result of a comparison of the difference between the first and second blocks and the configurable difference threshold and based on a minimum length threshold.

24. The method of claim 23, wherein the configurable difference threshold is configured based on a nature of the tokens in the first and second token streams.

25. The method of claim 14, further comprising:
determining a quantity of the one or more intervening tokens that differ between the first block and the second block; and
determining the difference between the first block and the second block by dividing the quantity of differing tokens by a length of the two or more of the identified common sub-sequences.

26. A software product tangibly stored on a machine-readable medium, the software product comprising instructions operable to cause a programmable processor to perform operations comprising:
identifying sub-sequences common to a first token stream and a second token stream;
designating a first block of sub-sequences in the first token stream, the first block of sub-sequences including two or more of the identified common sub-sequences;
designating a second block of sub-sequences in the second token stream, the second block of sub-sequences including the two or more of the identified common sub-sequences, wherein at least one of the first and second blocks includes one or more intervening tokens separating at least two of the two or more of the identified common sub-sequences; and designating the first and second blocks as a matched block pair based on a result of a comparison of a difference between the first and second blocks and a difference threshold.

27. The software product of claim 26, wherein the operations further comprise:
grouping matched block pairs from the first and second token streams based on an order of the matched block pairs in the first and second token streams; and
presenting matched block information based on the grouped matched block pairs.

28. The software product of claim 27, wherein the matched block pairs include identified common sub-sequences not included in any matched block pairs designated based on the difference threshold, and wherein grouping the matched block pairs comprises selecting the matched block pairs for grouping based on lengths.

29. The software product of claim 26, wherein identifying the common sub-sequences comprises:
generating an editscript for the first and second token streams using a predefined sequences differencing technique; and
identifying the common sub-sequences using the generated editscript.

30. The software product of claim 26, wherein the difference threshold comprises a configurable difference threshold, and wherein designating the first and second blocks comprises designating the first and second blocks as a matched block pair based on a result of a comparison of the difference between the first and second blocks and the configurable difference threshold and based on a minimum length threshold.

31. The software product of claim 26, wherein the operations further comprise:
determining a quantity of the one or more intervening tokens that differ between the first block and the second block; and
determining the difference between the first block and the second block by dividing the quantity of differing tokens by a length of the two or more of the identified common sub-sequences.

32. A software product tangibly stored on a machine-readable medium, the software product comprising instructions operable to cause a programmable processor to perform operations comprising:
obtaining a first token stream and a second token stream;
comparing the first and second token streams to identify a group of tokens that are substantially similar in the first and second token streams, the similar-tokens group including common sub-sequences, which are identical in the first and second token streams, and at least one unmatched intervening token separating the common sub-sequences; and
presenting matched token information corresponding to the similar-tokens group to illustrate changes in document flow.

33. The software product of claim 32, wherein obtaining a first token stream and a second token stream comprises:
receiving text information; and
converting the text information into the first and second token streams.

34. The software product of claim 33, wherein the similar-tokens group comprises tokens corresponding to words in the text information, and wherein comparing the first and second token streams comprises:
using a predefined sequences differencing technique to identify sub-sequences of words common to the first and second token streams;
selecting a sub-sequence from the identified sub-sequences of words; and
extending the selected sub-sequence to include one or more additional sub-sequences and one or more intervening words from the first and second token streams in order to form the similar-tokens group.

35. The software product of claim 32, wherein the operations further comprise:
obtaining additional common sub-sequences and one or more additional groups of tokens that are substantially similar in the first and second token streams;
combining matched sets of tokens based on their order in the first and second token streams while disregarding intervening tokens, the matched sets of tokens including the similar-tokens groups and the additional common sub-sequences; and
presenting matched token information corresponding to the combined matched sets of tokens to illustrate changes in document flow.

36. The software product of claim 35, wherein combining matched sets of tokens comprises combining matched sets of tokens starting with a matched set of tokens having a longest common sub-sequence.

37. The software product of claim 35, wherein presenting matched token information based on the combined matched sets of tokens comprises displaying the first and second token streams using colors to designate the combined matched sets of tokens including the similar-tokens group that includes the at least one unmatched token.

38. A system comprising:
means for obtaining a first token stream and a second token stream; and
means for comparing the first and second token streams to detect a matched block of tokens including matched sub-sequences moved from first positions in the first token stream to second positions in the second token stream, the matched block of tokens also including at least one unmatched intervening token separating the matched sub-sequences, and the matched block of tokens being substantially similar in the first and second token streams.

39. The system of claim 38, wherein the means for obtaining comprises:
means for receiving text information; and
means for converting the text information the first and second token streams.

40. The system of claim 38, further comprising:
means for obtaining additional matched blocks of tokens from the first and second token streams, the additional matched blocks of tokens including at least one block having a single matched sub-sequence and no unmatched tokens;
means for grouping the matched blocks of tokens based on an order of the matched blocks of tokens in the first and second token streams while disregarding intervening tokens; and
means for presenting matched block information based on the grouped matched block pairs to illustrate changes in document flow.

41. The system of claim 40, wherein the means for presenting matched block information comprises means for displaying the first and second token streams using colors to designate the grouped matched blocks of tokens including the matched block that includes the at least one unmatched token.

* * * * *

UNITED STATES PATENT AND TRADEMARK OFFICE
CERTIFICATE OF CORRECTION

PATENT NO.        : 7,398,200 B2
APPLICATION NO.   : 10/272858
DATED             : July 8, 2008
INVENTOR(S)       : William Ie, Adam E. Altman and Edward R. W. Rowe Page 1 of 1

It is certified that error appears in the above-identified patent and that said Letters Patent is hereby corrected as shown below:

On the Title Page - (75) INVENTORS:
    left column, line 6:
        delete "San Jose, CA", and replace with --Woodinville, WA--

On the Title Page, OTHER PUBLICATIONS:
    right column, line 4:
        delete "Hierarchially", and replace with --Hierarchically-- right column, line 17:
        delete "Traking", and replace with --Tracking--

Claim 39:
    column 18, line 45:
        after "information", insert --into--

Signed and Sealed this

Twenty-fourth Day of February, 2009

JOHN DOLL
*Acting Director of the United States Patent and Trademark Office*